United States Patent
Boss et al.

(10) Patent No.: US 8,654,953 B2
(45) Date of Patent: Feb. 18, 2014

(54) MANAGING SUBCONFERENCE CALLS WITHIN A PRIMARY CONFERENCE CALL

(75) Inventors: Gregory J. Boss, Saginaw, MI (US); Andrew R. Jones, Round Rock, TX (US); Charles S. Lingafelt, Durham, NC (US); Kevin C. McConnell, Austin, TX (US); John E. Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 12/949,179

(22) Filed: Nov. 18, 2010

(65) Prior Publication Data

US 2012/0128146 A1     May 24, 2012

(51) Int. Cl.
*H04M 3/56* (2006.01)
*H04N 7/15* (2006.01)
*H04L 12/18* (2006.01)
*G06F 3/048* (2013.01)

(52) U.S. Cl.
USPC ............. 379/202.01; 348/14.08; 370/260; 379/93.21; 455/416; 715/753

(58) Field of Classification Search
USPC ............. 379/202.01–206.01, 93.21, 158; 348/14.08–14.1; 370/260–262; 455/416; 715/751, 753
See application file for complete search history.

(56) References Cited

U.S. PATENT DOCUMENTS

| | | | |
|---|---|---|---|
| 6,373,936 B1 | 4/2002 | Raniere et al. | |
| 6,404,873 B1 | 6/2002 | Beyda et al. | |
| 7,317,791 B2 * | 1/2008 | Carlson | 379/202.01 |
| 7,634,074 B2 | 12/2009 | Coulas et al. | |
| 7,653,013 B1 | 1/2010 | Moran | |
| 2004/0184586 A1 * | 9/2004 | Coles et al. | 379/88.14 |
| 2007/0091830 A1 | 4/2007 | Coulas et al. | |
| 2008/0065998 A1 * | 3/2008 | Brown et al. | 715/755 |
| 2011/0261944 A1 * | 10/2011 | Burt | 379/204.01 |
| 2012/0177192 A1 * | 7/2012 | Burt | 379/202.01 |

FOREIGN PATENT DOCUMENTS

CN      101291373      10/2008

OTHER PUBLICATIONS

"Polycom® Productivity . . . ", http://www.polycom.com/products/voice/desktop_solutions/soundpoint/applications/visual_conference_management.html, downloaded Jul. 30, 2010, pp. 1.
Best Conferencing, "Bestconferencing—User Tips and Tools", Bestconferencing.com, Feb. 2007, pp. 1-15.
Compunetix, "Contex Summit WOC, Create and Contorl Powerful . . . ", Compunetix.com, copyright 2009, pp. 1-2.
MCI Worldcom Communications, Inc., "Audioconferencing", DOIT Master Agreement No. B-03-013, FEIN 47-0751768, Aug. 1, 2005, pp. 1-10.

* cited by examiner

*Primary Examiner* — Harry Hong
(74) *Attorney, Agent, or Firm* — John Pivnichny; Roberts Mlotkowski Safran & Cole, P.C.

(57) ABSTRACT

Managing subconference calls within a primary conference call. An approach includes establishing a primary conference call including a plurality of participants, establishing a subconference call including a subset of the plurality of participants, and providing respective output signals to each of the plurality of participants. Members of the primary conference call are provided with audio only of the primary conference call, and members of the subconference call are provided with audio of the subconference call. The approach also includes providing a visual display that shows respective groupings of members of the subconference call and members of the primary conference call.

24 Claims, 8 Drawing Sheets

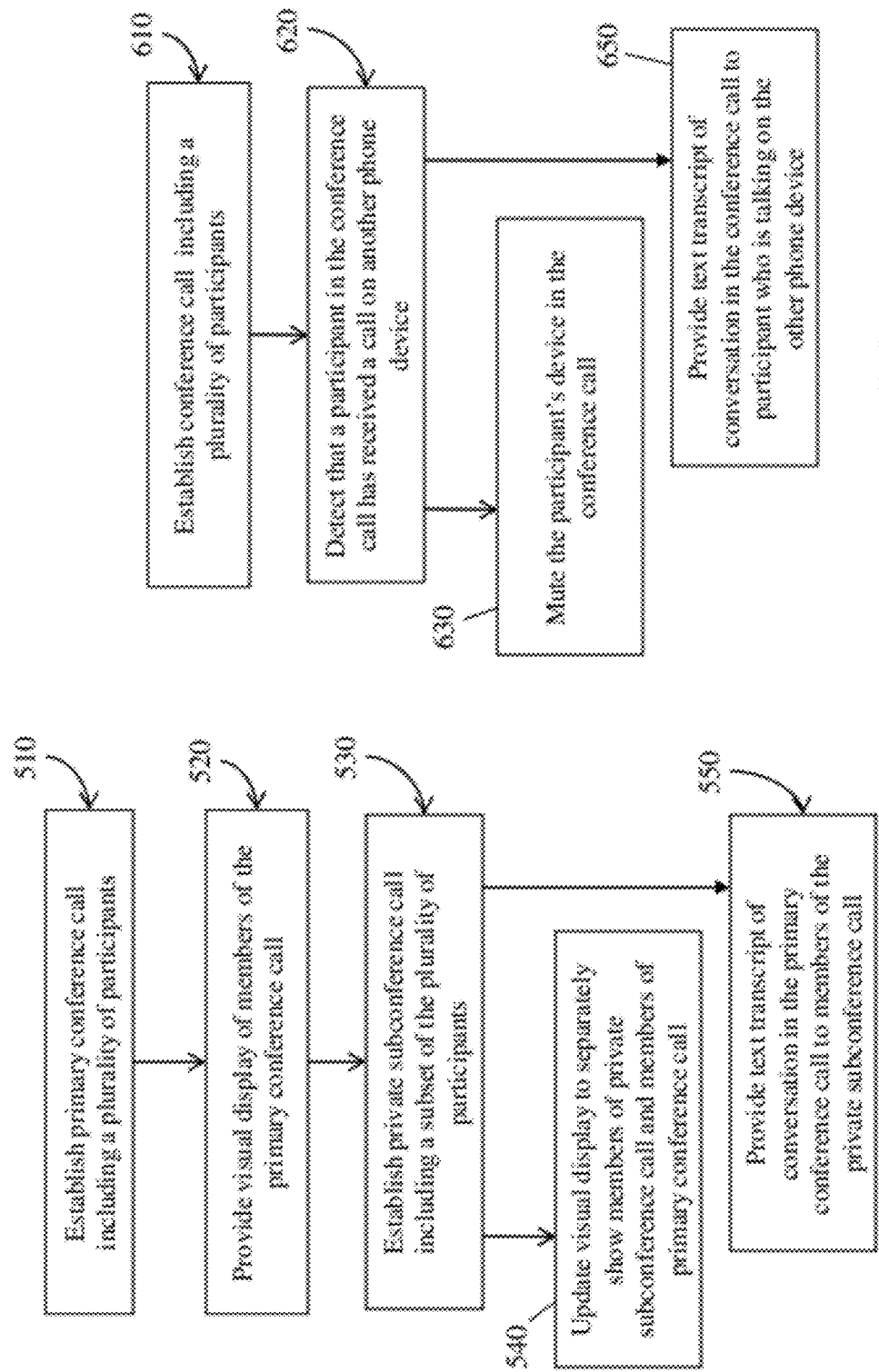

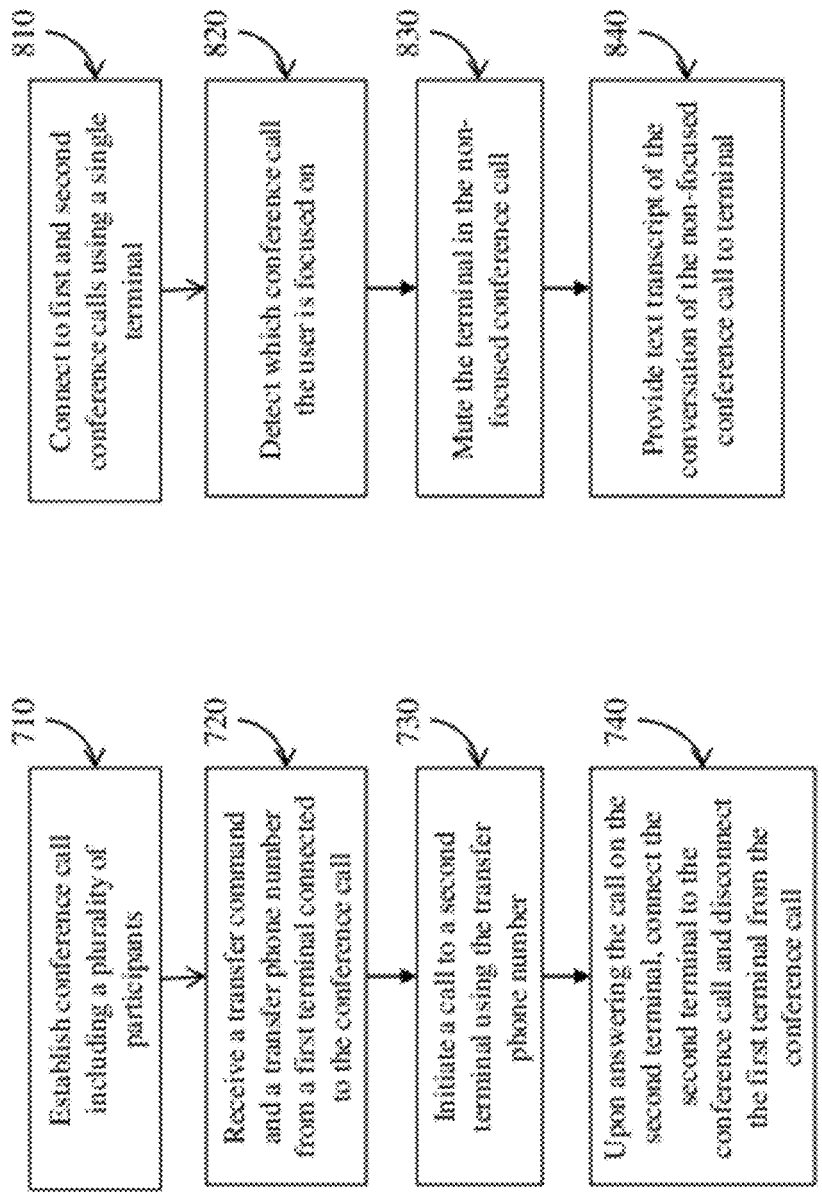

MANAGING SUBCONFERENCE CALLS WITHIN A PRIMARY CONFERENCE CALL

TECHNICAL FIELD

The present invention generally relates to conference calls and, more particularly, to methods and systems for managing subconference calls within a primary conference call.

BACKGROUND

Businesses around the globe are constantly striving to reduce operating costs in order to improve profitability. Additionally, the population of work-at-home employees has been steadily increasing in recent years. The practice of utilizing conference calls helps companies reduce travel costs and enables work-at-home and remote users. Conference calls can often involve large numbers of people, often as many as a dozen and sometimes numbers into the hundreds.

There are often times when a sub-group of people on a conference call wish to communicate privately amongst themselves. For example, two participants of a conference call may want to confer with each other on a private matter without other participants of a conference call being able to observe or hear the conversation. This is commonly referred to as a sidebar.

One way such sidebar communications may be performed during conference calls is via instant messaging. Instant messaging allows for simultaneous communication channels (e.g., one voice channel for the conference call and one instant messaging channel for the sidebar) with a different set of people. Conducting a sidebar using instant messaging requires that each member of the sidebar use a computer to conduct the instant messaging; however, participants of a conference call commonly connect via their telephone only, and do not have ready access to a computer during the conference call. Even when conference call participants do have a computer and Internet connection, they commonly require special firewall access in business situations (e.g., a virtual private network (VPN) at remote sites) in order to connect to each other. Moreover, the communication medium of instant messaging does not offer the same context and speed and type of information as that of voice.

Another way to perform sidebar communications during a conference call is to ask those participants already on the conference call to hold while the sidebar initiator puts everyone else on mute. The sidebar initiator then uses another (e.g., second) phone or phone line and initiates another independent call to one or more parties on the original call. However, it typically costs more to establish another conference bridge between the multiple parties of the sidebar. Moreover, asking everyone else to hold creates a disruption to the original conference call. Additionally, the members of the sidebar are isolated from the original conference call and cannot follow what is being said on the primary call while the sidebar is in progress. Also, it takes a significant amount of time to locate the phone numbers of those that are to be part of the secondary call.

SUMMARY

In a first aspect of the invention, there is a method implemented in a computer infrastructure having computer executable code tangibly embodied on a computer readable storage medium having programming instructions operable to implement the steps of the method. The method includes: establishing a primary conference call including a plurality of participants, establishing a subconference call including a subset of the plurality of participants, and providing respective output signals to each of the plurality of participants. Members of the primary conference call are provided with audio only of the primary conference call, and members of the subconference call are provided with audio of the subconference call. The method also includes providing a visual display that shows respective groupings of members of the subconference call and members of the primary conference call.

In another aspect of the invention, there is a method of deploying a system for managing a subconference call within a primary conference call. The method includes providing a computer infrastructure that operates to: establish the primary conference call including a plurality of participants; establish the subconference call including a subset of the plurality of participants; and provide respective output signals to each of the plurality of participants. Members of the primary conference call are provided with audio only of the primary conference call, and members of the subconference call are provided with audio of the subconference call. The computer infrastructure further operates to: provide a visual display that shows respective groupings of members of the subconference call and members of the primary conference call; generate a text transcript of the audio of the primary conference call; and transmit the text transcript to the members of the subconference call. The transmitting is performed in real time for a duration of the subconference call or is performed at a conclusion of the subconference call. The providing the respective output signals includes providing the members of the subconference call with the audio of the primary conference call and an option to adjust a volume of the audio of the primary conference call. The establishing the subconference call comprises at least one of: detecting a predefined trigger word or phrase spoken by one of the plurality of participants, and receiving an instruction via a graphical user interface to add or remove at least one of the plurality of participants to/from the subconference call.

In another aspect of the invention, a system includes a conference server comprising a processor, a memory, and a conference manager application. The conference manager application operates to: establish the primary conference call including a plurality of participants; establish the subconference call including a subset of the plurality of participants; and provide respective output signals to each of the plurality of participants. Members of the primary conference call are provided with audio only of the primary conference call, and members of the subconference call are provided with audio of the subconference call. The conference manager application also operates to: provide a visual display that shows respective groupings of members of the subconference call and members of the primary conference call; and transmit a text transcript of a conversation of the primary conference call to the members of the subconference call.

In an additional aspect of the invention, a computer program product comprising a computer usable storage medium having readable program code embodied in the medium is provided. The computer program product includes at least one component operable to: establish the primary conference call including a plurality of participants; establish the subconference call including a subset of the plurality of participants; and provide respective output signals to each of the plurality of participants. Members of the primary conference call are provided with audio only of the primary conference call, and members of the subconference call are provided with audio of the subconference call. The at least one component is further operable to: provide a visual display that shows respective groupings of members of the subconference call and members of the primary conference call; and transmit a text transcript of a conversation of the primary conference call to the members of the subconference call, wherein the transmitting is performed in real time for a duration of the subconference call or is performed at a conclusion of the subconference call In a further aspect of the invention, there is a computer system for managing a subconference call within a primary conference call. The system comprises a CPU, a computer readable memory and a computer readable storage media. Additionally, the system comprises first program instructions to establish the primary conference call including a plurality of participants; second program instructions to establish the subconference call including a subset of the plurality of participants; third program instructions to provide respective output signals to each of the plurality of participants, wherein members of the primary conference call are provided with audio only of the primary conference call, and members of the subconference call are provided with audio of the subconference call; fourth program instructions to provide a visual display that shows respective groupings of members of the subconference call and members of the primary conference call; and fifth program instructions to transmit a text transcript of a conversation of the primary conference call to the members of the subconference call. The first, second, third, fourth, and fifth program instructions are stored on the computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIGS. 10-13 show exemplary process flows in accordance with aspects of the invention.

DETAILED DESCRIPTION

Figure 1:
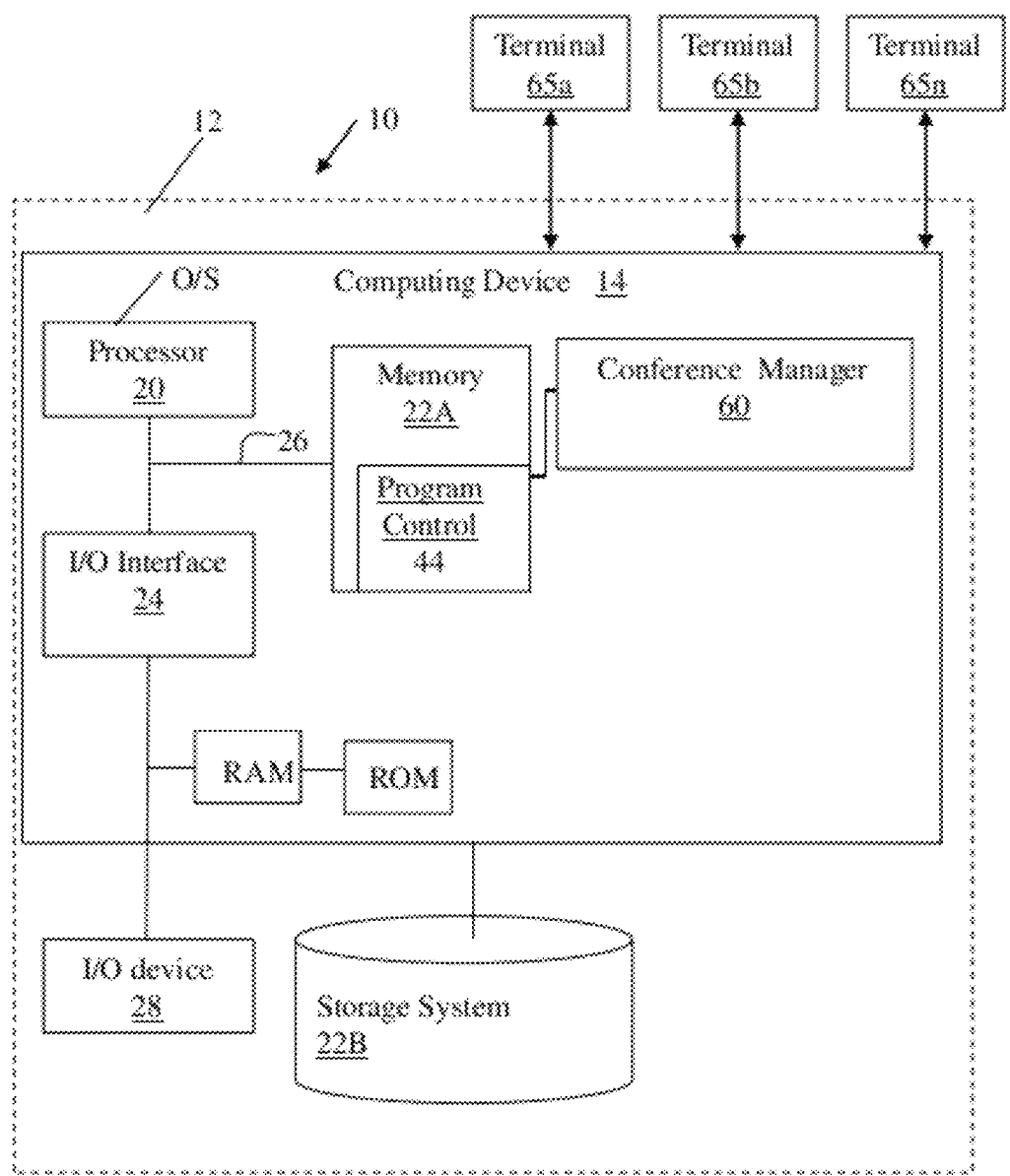
FIG. 1 an illustrative environment for implementing the steps in accordance with aspects of the invention.

The present invention generally relates to conference calls and, more particularly, to methods and systems for managing subconference calls within a primary conference call. In accordance with aspects of the invention, there are methods and systems to provision and manage a new private subconference call within an existing primary conference call where a sidebar discussion may occur without hanging up on the primary conference call, and without using a second phone line or session to connect the parties of the private subconference call. In embodiments, a text transcript of the primary conference call is provided to parties within the subconference call while the parties are in the subconference call. This enables the parties in the subconference call to stay abreast of, or later come up to speed with, what transpired in the primary conference call during the holding of the subconference call. In embodiments, a participant may be automatically placed into, or taken out of, a subconference call by speaking word triggers based on verbal queues. In additional embodiments, participants are provided with a visual indication of who is in the primary conference call and who is in the subconference call. Furthermore, implementations of the invention utilize a single sign-on to the primary conference call, and participants may join a subconference call without having to re-enter their sign-on information.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, the environment 10 includes a server or other computing system 12 that can perform the processes described herein. In particular, the computing system 12 includes a computing device 14. The computing device 14 can be resident on a network infrastructure or computing device of a third party service provider (any of which is generally represented in FIG. 1).

The computing device 14 also includes a processor 20, a memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls a conference manager 60 configured to perform one or more of the processes described herein. The conference manager 60 can be implemented as one or more program code in the program control 44 stored in memory 22A as separate or combined modules. Additionally, the conference manager 60 may be implemented as separate dedicated processors or a single or several processors to provide the function of these tools. While executing the computer program code, the processor 20 can read and/or write data to/from memory 22A, storage system 22B, and/or I/O interface 24. The program code executes the processes of the invention. The bus 26 provides a communications link between each of the components in the computing device 14.

In embodiments, the computing device 14 communicates with a plurality of terminals 65a, 65b, . . . , 65n (referred to generally as 65). As described herein, each terminal 65 comprises a communication device that enables a user to communicate in a conference call environment. Each terminal 65 may comprise, for example, a land-line telephone, a cellular telephone, a smart phone, or any other suitable computer device (e.g., desktop, laptop, notebook, netbook, or tablet computer) capable of being used as a telephone in association with a conference call. In accordance with aspects of the invention, the conference manager 60 manages a primary conference call amongst the plurality of terminals 65, and also simultaneously manages one or more private subconference calls amongst a subset of the plurality of terminals 65, as described in greater detail herein.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
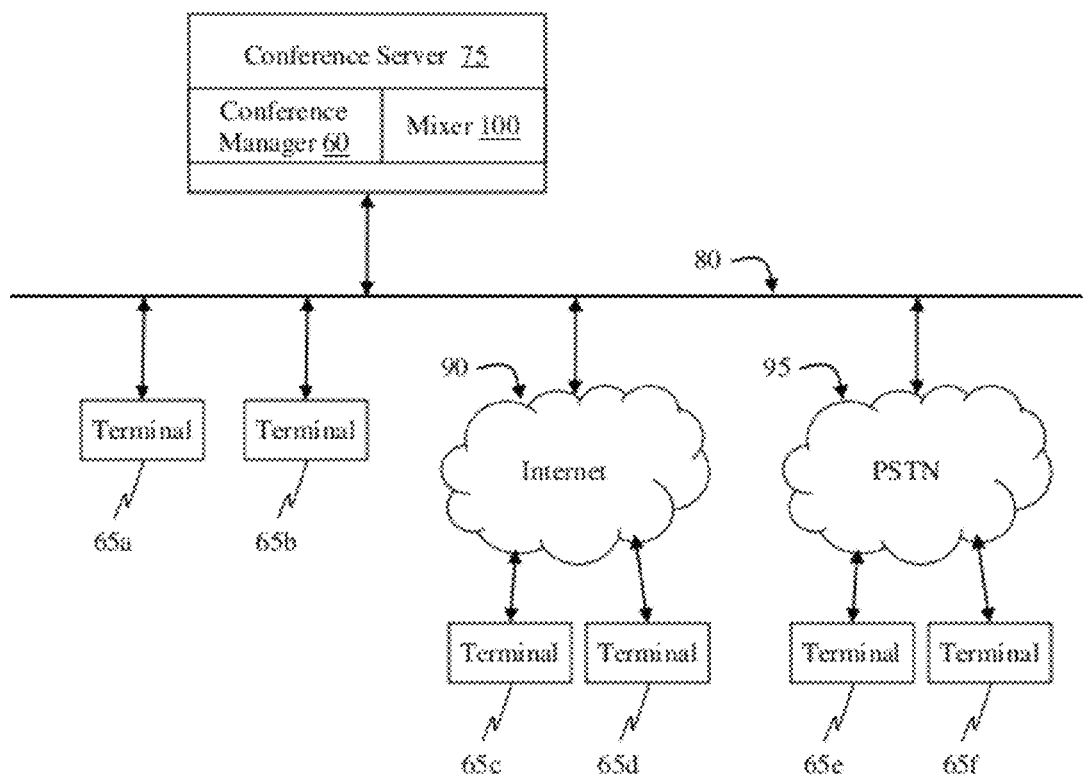
FIG. 2 shows a system in accordance with aspects of the invention.

FIG. 2 shows a system in accordance with aspects of the invention. The system comprises a conference server 75 which may comprise the computing device 14 including the conference manager 60 described with respect to FIG. 1. The conference server 75 communicates with a plurality of terminals 65*a-f* via a network 80. The terminals 65*a-f* may be the same as terminals 65 described with respect to FIG. 1, and may comprise, for example, a land-line telephone, a cellular telephone, a smart phone, or a computer device (e.g., desktop, laptop, notebook, netbook, or tablet computer) capable of being used as a telephone (e.g., capable of sending and receiving at least audio signal/data in association with a conference call). The network 80 may comprise any suitable communication network such as a LAN or WAN, and in particular may comprise a packet switched network.

As depicted in FIG. 2, one or more of the terminals may be directly connected to the network 80, such as terminals 65*a* and 65*b*. Other terminals may be indirectly connected to the network 80, such as terminals 65*c* and 65*d* connected via the Internet 90, and terminals 65*e* and 65*f* connected via a public switched telephone network (PSTN) 95.

The conference server 75 may further comprise a mixer 100 that receives media streams from conference participants (e.g., terminals 65*a-f*) during a conference, mixes the media streams, and redistributes an appropriate output media stream to each of the terminals 65*a-f*. The mixer 100 may be comprised in the conference server 75, as shown in FIG. 2, or may be a separate entity that communicates with the conference server 75. Aspects of the invention are described using audio media streams as an example; however, the media employed by the conference call and processed by the mixer 100 may include any suitable media, such as audio, video, text, etc.

In accordance with aspects of the invention, the conference server 75 manages a primary conference call amongst the terminals 65*a-f*, and also manages one or more private subconference calls amongst a subset of the terminals 65*a-f*. In embodiments, the conference manager 60 maintains a list of which conference participants are members of the primary conference call, and maintains a separate list of which conference participants are members of a subconference call. The conference manager 60 may also maintain other conference data, such as associations between users and terminals, network locations of terminals, etc., all of which may be stored in storage system 22B. The conference manager 60 informs the mixer 100 of the respective members of the primary conference call and the subconference call. The mixer 100 receives all of the media inputs from all terminals, and generates an appropriate respective output signal for each respective terminal based on whether a particular terminal is a member of the primary conference call or a member of the subconference call.

Figure 3:
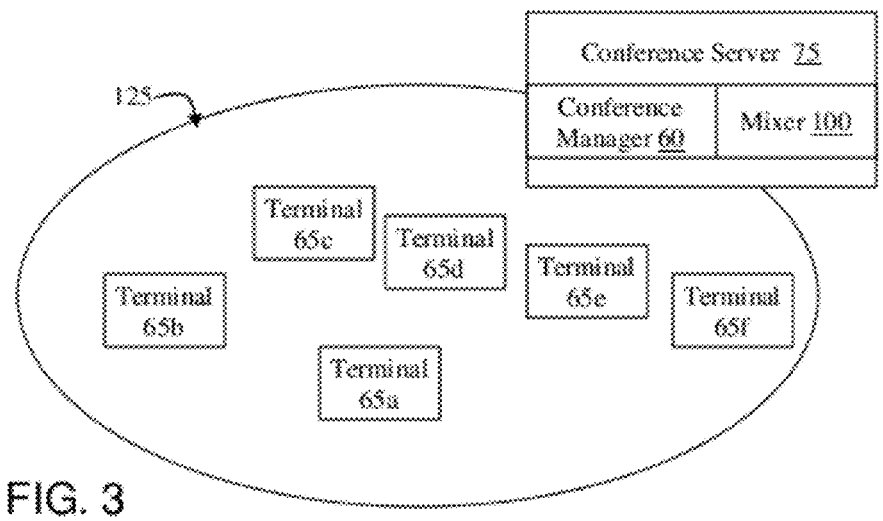
FIGS. 3 and 4 show exemplary groupings of conference calls in accordance with aspects of the invention.
Figure 4:
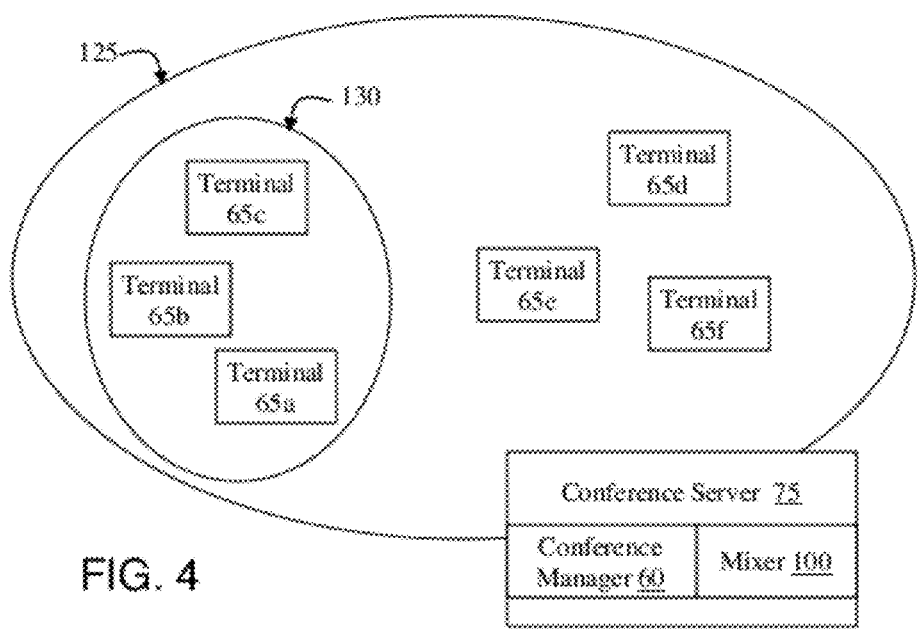

For example, FIGS. 3 and 4 pictorially depict groupings of the terminals 65*a-f* in various conference calls. In particular, FIG. 3 shows a grouping of terminals 65*a-f* in a primary conference call 125. In the primary conference call, the mixer 100 receives an input media signal (e.g., an audio signal) from each terminal 65*a-f*. The mixer 100 combines the signals from terminals 65*b-f* and provides this combined media stream as an output to terminal 65*a*. In this manner, the user of terminal 65*a* hears what the users of terminals 65*b-f* say during the primary conference call 125. Similarly, the mixer combines the signals from terminals 65*a* and 65*c-f* and provides this combined media stream to terminal 65*b*, and so on for each respective terminal. In implementations, each member of the primary conference call 125 is able to hear every other member of the primary conference call 125.

FIG. 4 shows the creation of a private subconference call 130 within the primary conference call 125. As used herein, a private subconference call (also referred to as a virtual call) is a private conference call between two or more parties who are also simultaneously part of another previously established conference call. In embodiments, the primary conference call has a number "N" users and the virtual call has a number "N" minus "P" users, where "P" is less than "N", e.g., a proper subset. In the particular example shown in FIG. 4, the subconference call 130 includes terminals 65*a-c*, while the primary conference call 125 includes terminals 65*a-f*. The members of the subconference call 130 (e.g., terminals 65*a-c*) are still connected to the primary conference call 125. The mixer 100 creates the outgoing signals for each terminal 65*d-f* such that the members of the primary conference call 125 can hear each other, but cannot hear the members of the private subconference call 130. For example, a user of terminal 65*d* may hear what the users of terminals 65*e* and 65*f* say; however, the user of terminal 65*d* cannot hear what the users of terminals 65*a-c* say during the subconference call 130.

The mixer 100 creates the outgoing signals for each terminal 65*a-c* such that the members of the private subconference call 130 can hear each other. For example, the user of terminal 65*a* can hear the users of terminals 65*b* and 65*c*. In a first embodiment, the mixer 100 is configured to permit the members of the private subconference call 130 to hear the members of the primary conference call 125. For example, in this embodiment, the user of terminal 65*a* can hear the users of terminals 65*d-f*. In an alternative embodiment, the mixer 100 is configured such that the members of the private subconference call 130 cannot hear the members of the primary conference call 125. For example, in this alternative embodiment, the user of terminal 65*a* cannot hear the users of terminals 65*d-f*.

In an even further embodiment, the members of the subconference call 130 are provided with the audio of the primary conference call 125 and can individually adjust the volume of the primary conference call 125 that is being output by their terminal. For example, terminal 65*a* may receive the audio from all terminals 65*b-f*, and may reduce the volume of the audio from terminals 65*d-f* relative to the audio from terminals 65*b* and 65*c*. In this manner, the user of terminal 65*a* can hear conversations in both the subconference call 130 and the primary conference call 125 simultaneously, but with the primary conference call 125 conversation at a lower volume than the subconference call 130 conversation. As such, the members of the subconference call 130 may, at their individual control, determine the level of audio from the primary conference call 125 that will be mixed with the audio of the subconference call 130. This volume control may be implemented as a feature of a graphical user interface (GUI) displayed by the terminals 65.

The invention is not limited to the exemplary groupings shown in FIGS. 3 and 4, and any desired number of terminals may be included in the primary conference call 125 and private subconference call 130. Moreover, there may be more than one private subconference at any given time within a single primary conference. When plural subconferences exist simultaneously, they may be mutually exclusive of one another, or one subconference may be embedded (e.g., nested) within another subconference. The conference manager 60 maintains a definition of the members of the primary conference and each private subconference in the form of lists of users and/or terminals associated with the users. The conference manager 60 provides these definitions to the mixer 100, which receives the input signals from each terminal and generates a respective output signal for each terminal based on the definitions.

The conference server 75, including the conference manager 60 and mixer 100, may employ any suitable communication protocol for establishing, managing, and ending the primary conference call 125 and one or more private subconference calls 130. For example, the conference server 75 may use session initiated protocol (SIP) commands to initiate, conduct, and tear down the primary conference call 125 and any private subconference calls 130. Alternatively, the conference server 75 may utilize Packet Based Multimedia Communications Systems (e.g., the H.323 standard) for maintaining the primary conference call 125 while initiating, conducting, and ending the private subconference call 130. The underlying protocol for handling the various conferences is not important to the instant invention, however, and the skilled artisan will recognize that different protocols may be used within the scope of the invention.

In accordance with aspects of the invention, when a private subconference call 130 exists within a primary conference call 125, the conference manager 60 records a transcript of the audio of the primary conference call 125. In embodiments, the conference manager 60 is programmed with, or is provided access to, a voice-to-text transcribing component. The conference manager 60 monitors the audio signals of the members of the primary conference call 125 and transcribes these audio signals (e.g., transcribes the speech) to a text format. In implementations, the conference manager 60 provides this text transcription of the audio of the primary conference call 125 to the members of the private subconference call 130. In this manner, members of the subconference call 130 may monitor the conversation in the primary conference call 125 while the subconference call 130 is ongoing.

For example, referring to FIG. 4, the conference manager 60 generates a text transcript of the audio of the primary conference call 125 (e.g., what is said by the users of terminals 65*d-f*), and transmits this text transcript to the members of the subconference call 130 (e.g., terminals 65*a-c*). In embodiments, during the time frame that the subconference call 130 is in place, each terminal 65*a-c* is provided with a real time transcript of the voice-to-text conversion of the conversation occurring in the primary conference call 125. This allows the subconference call 130 participants to follow the primary conference call 125 conversation while on the subconference call 130. Voice-to-text transcription software (also called speech-to-text transcription software, voice transcription software, an speech recognition software) is known such that further explanation of creating the text transcript is not believed necessary.

In embodiments, the conference manager 60 generates and provides the text transcript for the entire duration of the subconference call 130. In one embodiment, the conference manager 60 transmits the text transcript to each one of the terminals included in the subconference call 130 as a real-time, e.g., line-by-line, text display that may be viewed on the user's terminal (e.g., terminal 65*a*). Such real time transmission may be provided in any desired manner including, for example, standards based real time feeds such as RSS (Really Simple Syndication) or auto refreshing web pages. Additionally or alternatively, the conference manager 60 saves the text transcript as a file, and transmits the file to each of the terminals associated with the subconference call 130 at the conclusion of the subconference call 130. This latter embodiment is useful, for example, for a user of a standard cellular phone that cannot view the text transcript in real time.

In accordance with further aspects of the invention, the conference manager 60 provides visualization data to the terminals 65, the visualization data indicating respective participants of the primary conference call 125 and the subconference call 130. The terminals 65 may use the visualization data to generate a visual display that shows which participants are part of the primary conference call 125 and which participants are part of the subconference call 130.

Figure 5:
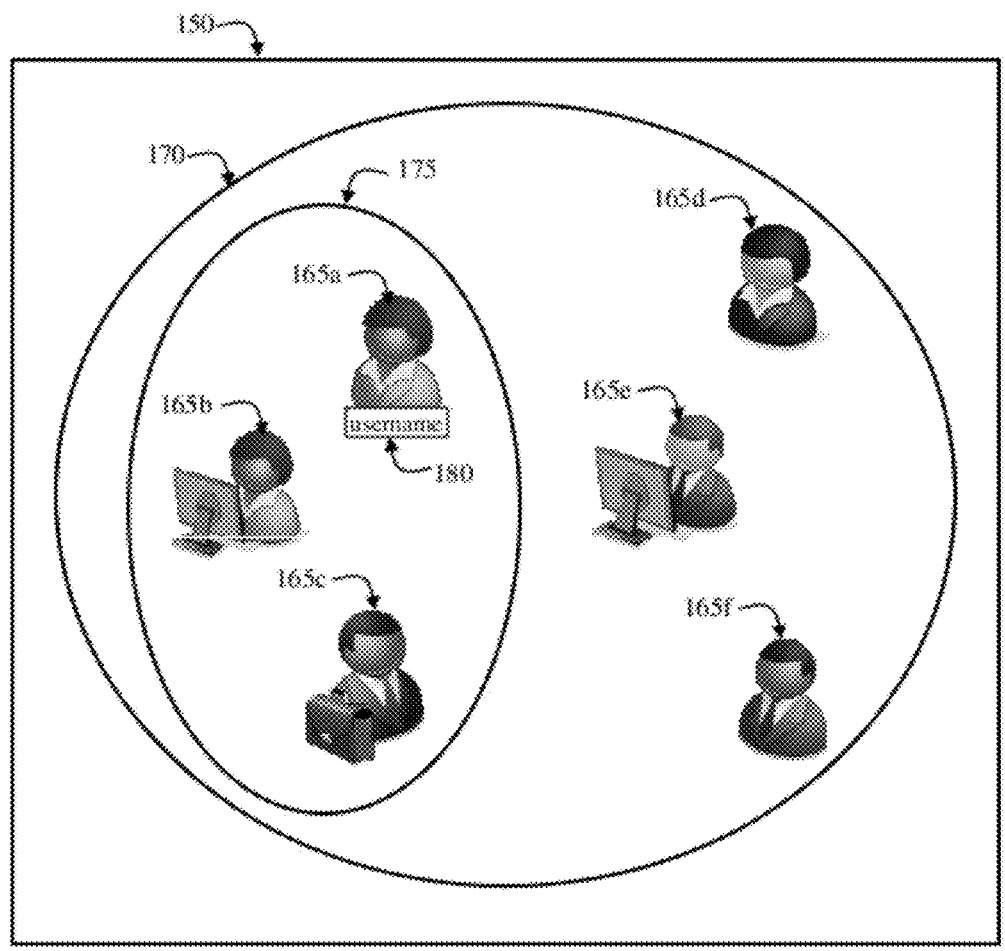
FIG. 5 shows a visual display in accordance with aspects of the invention.

For example, FIG. 5 shows a visual display 150 that may be displayed on a video display device of a terminal 65. The visual display 150 includes avatars 165*a-f* corresponding to the terminals 65*a-f* (e.g., from FIG. 4). The visual display 150 shows avatars 165*d-f* within a first area 170 that corresponds to the primary conference call 125 from FIG. 4. The visual display 150 also shows avatars 165*a-c* within a second area 175 that corresponds to the subconference call 130 from FIG. 4. In this manner, a conference participant may be provided with visual information that indicates who can hear the participant at any given time. The avatars (e.g., avatars 165*a-f*) may be any desired graphic, and may optionally include a username 180 indicating an identity of a user associated with the avatar. In further implementations, the avatars may be replaced with a video feed of the respective participant.

As described above, the conference manager 60 maintains lists of the respective participants of the primary conference call 125 and the subconference call 130. In embodiments, the conference manager 60 uses these lists to create a visual display 150, and the conference manager 60 transmits data defining the visual display to the terminals 65. The terminals 65 receive the data defining the visual display, and display the visual display on a video display device. When personalized avatars and/or usernames are used in the visual display 150, the conference manager 60 stores the personalized avatars and/or usernames and transmits the personalized avatars and/or usernames to the terminals as part of the visualization data. Alternatively, the conference manager 60 transmits the lists of participants to the terminals 65, and a client application running on the terminal 65 generates the visual display 150 from the received lists. As participants move into and/or out of a subconference call, the conference manager 60 updates the lists of participants, and sends new visualization data to the terminals 65 for updating the lists of participants to reflect the changed participants.

According to aspects of the invention, the visual display 150 may comprise a graphic user interface (GUI) that can receive input commands from a user of a terminal 65. In a particular exemplary implementation, the visual display 150 comprises a GUI which permits a user of the terminal to drag and drop avatars into and out of the second area 175 that corresponds to the subconference call 130. The drag and drop input may be provided to the GUI via a mouse pointer, touch screen, or any other suitable input technique.

In embodiments, a user whose avatar is within the second area 175 that corresponds to the subconference call 130 may use the GUI to drag their avatar outside of the second area 175. For example, the user associated with avatar 165*b* may interact with the GUI displayed on their terminal 65*b* to drag the avatar 165*b* outside of the second area 175. Upon receiving this input, this user's terminal 65*b* transmits a message to the conference manager 60, which removes this user from the subconference call 130. The conference manager 60 also transmits updated visualization data to the other terminals 65 to reflect this change. The conference manager 60 also controls or informs the mixer 100 that the terminal 65*b* is no longer included in the subconference call 130 so that the mixer 100 can provide an appropriate output signal for the terminal 65*b*. In this manner, a user may use the GUI to leave the subconference call 130 and return to the primary conference call 125.

In another embodiment, a user who is already a member of the subconference call 130 (e.g., a user whose avatar is within the second area 175) may invite another user to join the subconference call 130 by dragging and dropping the other user's avatar into the second area 175 in the GUI. For example, the user associated with avatar 165*a* may interact with the GUI displayed on their terminal 65a to drag the avatar 165e into the second area 175. Upon receiving this input, this user's terminal 65a transmits a message to the conference manager 60, which transmits an invitation message to the terminal 65e. The user of terminal 65e may use the GUI to accept the invitation, at which point the terminal 65e transmits an acceptance message back to the conference manager 60, and the conference manager 60 adds the terminal 65e to the subconference call 130. The conference manager 60 also transmits updated visualization data to the other terminals to reflect this change, and informs the mixer of the status change for appropriate signal processing. Alternatively, the user of terminal 65e may use the GUI to reject the invitation to join the subconference call 130, at which point the terminal 65e transmits a refusal message to the conference manager 60, and the conference manager 60 keeps the terminal 65e in the primary conference call 125 rather than moving the terminal 65e to the subconference call 130.

In accordance with additional aspects of the invention, conference participants are provided with the ability to transfer into and out of the subconference call 130 by speaking pre-defined words or phrases (also referred to herein as word triggers) into their terminal. In embodiments, the conference manager 60 maintains a list of pre-defined trigger words and monitors the audio signals of the respective terminals for the occurrence of any of the trigger words. The trigger words may be pre-defined by one or more of the participants, and may be stored at the conference server 75 (e.g., in memory 22B shown in FIG. 1). The same speech recognition software used by the conference manager 60 for generating the text transcript may also be used to detect trigger words.

In embodiments, upon recognition of one of the trigger words in the audio stream of one of the terminals 65, the conference manager 60 automatically places the participant who spoke the trigger word into a subconference call 130 with a predefined subset of the primary conference call 125 participants. Alternatively, upon recognition of one of the trigger words in the audio stream of one of the terminals 65, the conference manager 60 transmits a message to the terminal 65 asking the user of the terminal whether they wish to be moved to a subconference call 130. The user may respond with a voice command, GUI input, or keypad or keyboard input at the terminal 65. The conference manager 60, upon receipt of the answer from the terminal 65, either places the user in a private subconference call 130 or keeps the user in the primary conference call 125.

According to even further aspects of the invention, a user is not required to sign-on (e.g., provide authentication information) to create and/or join a subconference call 130. In embodiments, participants enter their authentication information (e.g., username, password, passcode, etc.) one time to initially join the primary conference call 125. Once a user is successfully authenticated and included in the primary conference call 125, the conference manager 60 does not require the user to re-enter their authentication information to move to a subconference call 130. In this manner, the user perceives the existing teleconference session as being reused.

In further embodiments, the conference manager 60 is programmed to synchronize two different communication devices for a single user who is a member of an existing conference (e.g., included in either the primary conference call 125 or subconference call 130). In embodiments, the conference manager 60 detects when a conference participant begins communicating on a second communication device. Upon detecting that the participant is communicating on a second communication device (e.g., a different phone device), different from the terminal 65 with which the participant is connected to the conference, the conference manager 60 mutes the participant in the conference (e.g., instructs the mixer 100 to not send this participant's audio to the other conference participants).

Figure 6:
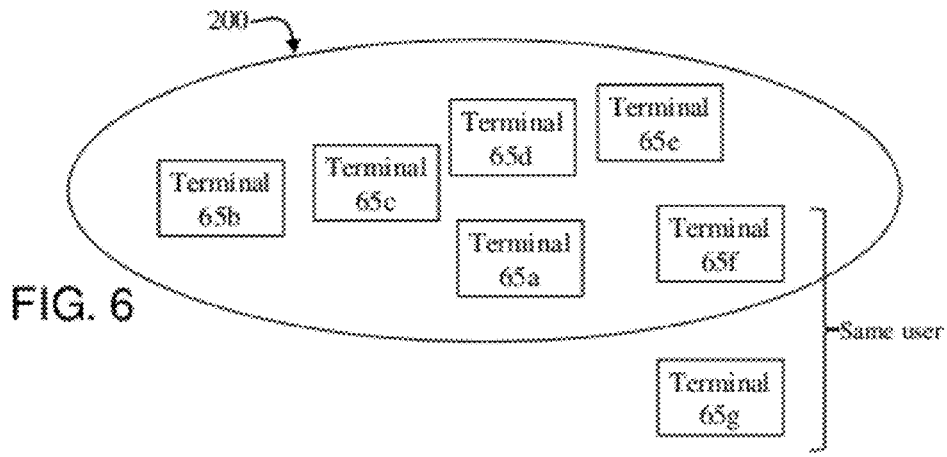
FIGS. 6-9 show exemplary groupings of conference calls in accordance with aspects of the invention.

In an illustrative example shown in FIG. 6, a conference call 200 (which may be a primary conference call or a private subconference call) may include participants associated with terminals 65a-f. When a participant associated with terminal 65f answers an incoming call on a different communication device 65g, the conference manager 60 detects the other call on the different communication device 65g and mutes the audio from the terminal 65f for the rest of the terminals 65a-e. In this manner, the users of the other terminals 65a-e do not hear the conversation that is taking place on the different communication device 65g. In addition to the muting, the conference manager 60 may also generate a text transcript of the conversation on the conference call 200, as described herein, and transmit the text transcript to the terminal 65f. In this manner, the user who is temporarily taken away from the conference call 200 to attend to another call on the different communication device 65g can still follow the conversation of the conference call 200. The conference manager 60 detects when the user terminates the other call on the different communication device 65g, and automatically turns off the muting of terminal 65f and/or stops generating the text transcript.

In accordance with other aspects of the invention, the conference manager 60 is programmed to transfer a user from a first terminal to a second terminal, without terminating the user's connection to a conference call. In embodiments, a user may enter (e.g., dial) a pre-defined code on their terminal followed by a phone number of another communication device. The terminal transmits this code and phone number to the conference manager 60, and the conference manager 60 places a call to the phone number. When the user answers the other communication device, the conference manager 60 disconnects the terminal from the conference and connects the other communication device to the conference. In this manner, a conference call participant may change terminals (e.g., switch from their office landline phone to a cellular phone) without having to leave the conference and rejoin (e.g., hang-up, dial in again, and re-enter authentication information) using the second terminal.

Figure 7:
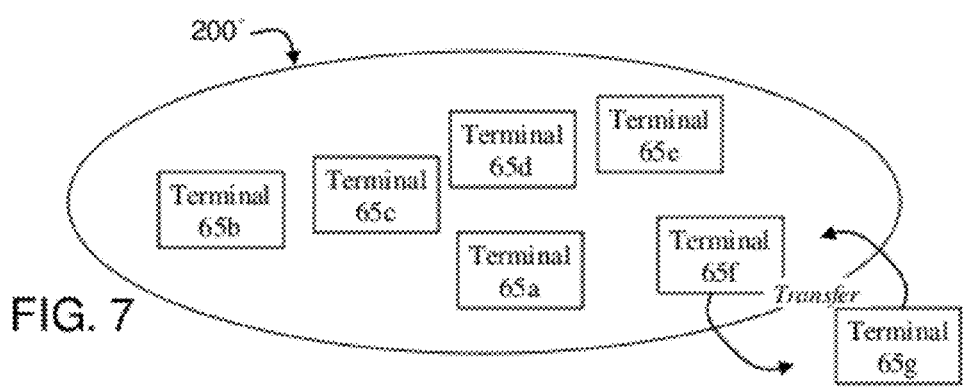
Figure 8:
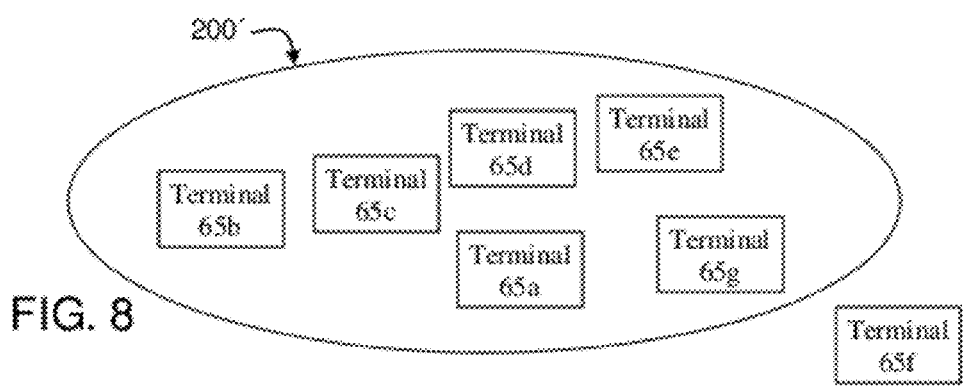

In an illustrative example shown in FIG. 7, a conference call 200' may include participants associated with terminals 65a-f. The participant associated with terminal 65f wishes to transfer to terminal 65g while staying on the conference call. The participant enters the predefined code into terminal 65f, along with the phone number of terminal 65g. The terminal 65f transmits the code and phone number to the conference manager 60. The conference manager 60 initiates a call to the terminal 65g using the received phone number. When the participant answers the call on terminal 65g, the conference manager 60 disconnects terminal 65f from the conference call 200' and connects terminal 65g to the conference call 200', as shown in FIG. 8. In this manner, the participant may seamlessly change terminals without having to hang up and subsequently re-enter the conference call.

In accordance with additional aspects of the invention, the conference manager 60 is programmed to detect when a terminal 65 is set to mute and when the participant is talking with the terminal 65 on mute. In such circumstances, the conference manager 60 automatically switches the terminal 65 off of mute so that the user's voice may be heard by other members of the conference call. Additionally, the conference manager 60 may be programmed to detect when a terminal 65 is set to mute and when another participant of the conference call speaks the name of the user whose terminal is muted. Based on this combination of factors, the conference manager 60 is programmed to automatically switch the terminal 65 off of mute. The same speech recognition software used by the conference manager 60 for generating the text transcript may also be used to detect a user's name spoken by one of the conference call participants.

Figure 9:
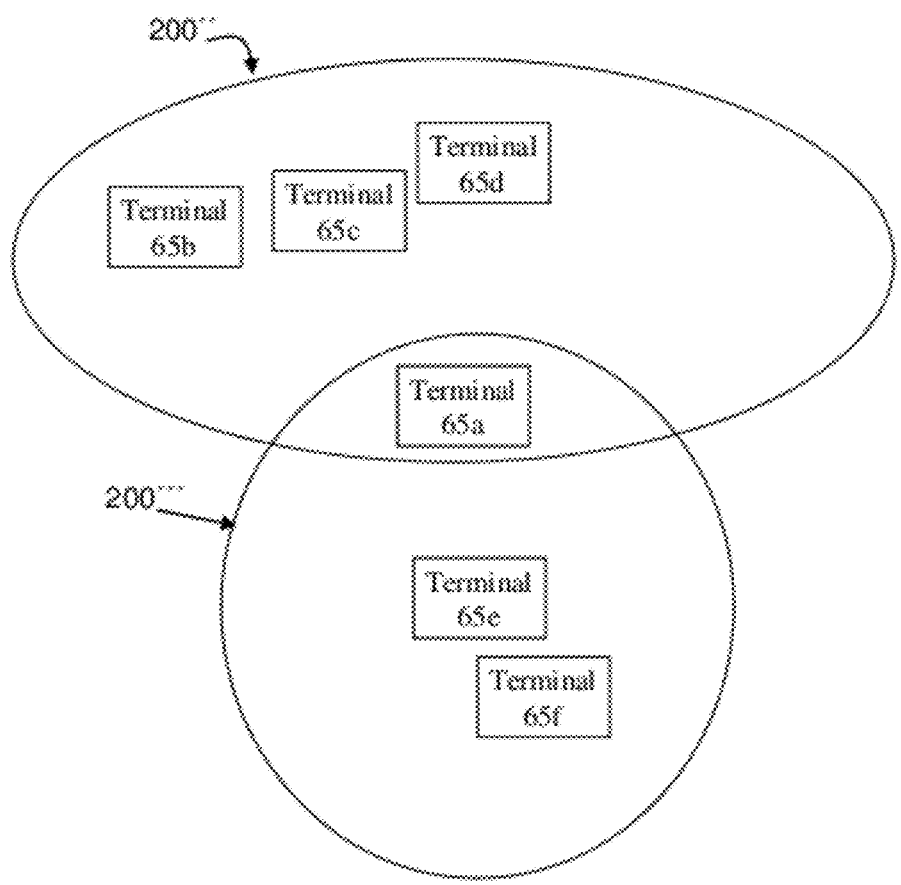

In accordance with further aspects of the invention, the conference manager 60 is programmed to detect which one of a plurality of conference calls a single user is focused on, and automatically switch that user to the focused-on conference call. As depicted in FIG. 9, a user may access two different conference calls 200" and 200''' using a single terminal 65a. The terminal 65a may comprise a computer device having a webcam, microphone, and speaker, as well as a video display. The video display may permit the user to have a different widows open on one or more video displays, one window for each respective conference call 200" and 200'''.

In embodiments, the conference manager 60 communicates with the terminal 65a to detect the particular conference call (e.g., 200" or 200''') on which the user is focused. The focus detection may be performed in any suitable manner, such as by detecting which window is active on the computer desktop, using an eye focus sensor that detects which window the user's eyes are looking at, etc. When the conference manager 60 determines that the user is focused on the first conference call 200", the conference manager 60 mutes this terminal 65a in the second conference call 200''', and vice versa. In this manner, the conference manager 60 automatically makes one conference call (e.g., 200") active, and relegates the other conference call (e.g., 200''') to the background. In implementations, the conference manager 60 generates a text transcript of the conversation on the muted conference call (e.g., 200''' in this example) and transmits the text transcript to the terminal 65a.

Flow Diagram

FIGS. 10-13 show exemplary flows for performing aspects of the present invention. The steps of FIGS. 10-13 may be implemented in the environment of FIG. 1 and/or FIG. 2, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 1 and/or FIG. 2. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 10 depicts an exemplary flow for a process in accordance with aspects of the present invention. At step 510, the conference server (e.g., conference server 75) establishes a primary conference call including a plurality of participants. The primary conference call may be the same as primary conference call 125 described above with respect to FIG. 3. Each participant may connect to the primary conference call using a terminal device, such as terminals 65 described above with respect to FIGS. 1-3.

At step 520, the conference server (e.g., via conference manager 60) provides a visual display of the members of the primary conference call. The display may be similar to display 150 shown in FIG. 5.

At step 530, the conference server establishes a private subconference call including a subset of the plurality of participants. The private subconference call may be the same as private subconference call 130 described above with respect to FIG. 4. A participant of the primary conference call may initiate or join the private subconference call in a manner described herein, such as by speaking a trigger word into their terminal and/or by providing input to a GUI portion of the visual display (e.g., dragging and dropping avatars into an area of the GUI representing the subconference call).

At step 540, the conference server updates the visual display to separately show the members of private subconference call and the members of primary conference call. This may be performed as described with respect to FIG. 5.

At step 550, the conference server provides a text transcript of conversation in the primary conference call to members of the private subconference call. This may be performed as described with respect to FIG. 4. The text transcript may be provided in real time during the private subconference call and/or as a file at the conclusion of the private subconference call.

FIG. 11 depicts an exemplary flow for a process in accordance with aspects of the present invention. At step 610, the conference server (e.g., conference server 75) establishes a conference call amongst a plurality of participants. This may be performed as in step 510.

At step 620, the conference server detects that a participant of the conference call is receiving a call on another communication device that is not connected to the conference call. This may be performed in a manner as described above with respect to FIG. 6. For example, in embodiments, step 620 is performed by the conference server communicating with a call server that is handling the call on the other communication device, the conference server receiving an indication from the call server that the user is engaged in a call on the other device.

At step 630, the conference server mutes the participant's terminal in the conference call so that other members of the conference call do not hear the conversation on the other communication device. This may be performed by the conference manager (e.g., conference manager 60) instructing the mixer (e.g., mixer 100) to not include any audio received from the participant's terminal to the other participants.

At step 650, the conference server provides a text transcript of conversation in the conference call to participant who is speaking on the other communication device. This may be performed as described with respect to FIG. 4, and similar to step 550.

FIG. 12 depicts an exemplary flow for a process in accordance with aspects of the present invention. At step 710, the conference server (e.g., conference server 75) establishes a conference call amongst a plurality of participants. This may be performed as in step 510.

At step 720, the conference server receives a transfer command and a transfer phone number from a first terminal connected to the conference call. This may be performed as described with respect to FIGS. 7 and 8. For example, a user who is connected to the conference call on a first terminal may wish to transfer their connection to the conference call to a second terminal without dropping the connection to the conference call. In embodiments, the user enters a predefined transfer code (e.g., series of key strokes) in the first terminal, along with a phone number of the second terminal. This data is sent from the first terminal to the conference server.

At step 730, the conference server initiates a call to the second terminal using the phone number (e.g., the phone number received at step 720). At step 740, when the user answers the call on the second terminal, the conference server connects the second terminal to the existing conference call and disconnects the first terminal from the conference call. In this manner, the user may perform a soft-transfer from one terminal to another without being dropped from the conference call.

FIG. 13 depicts an exemplary flow for a process in accordance with aspects of the present invention. At step 810, a user connects to two separate conference calls using a same terminal. This may be performed as described above with respect to FIG. 9, in which the terminal has the capability to dial into two (or more) separate conference calls that are occurring at the same time.

At step 820, a conference server detects which conference call the user is focused on. This may be performed as described above with respect to FIG. 9. For example, the conference server may poll the user's terminal to determine which conference window is active, and which conference window is inactive. Additionally or alternatively, the terminal may include eye focus sensor that detects which conference window the user is focused on (e.g., looking at) at any particular time. The terminal transmits data indicating the focused-on conference to the conference server. From this data, the conference manager may determine the focused conference and the non-focused conference.

At step 830, the conference server instructs the mixer (e.g., mixer 100) to mute the terminal in the non-focused conference, while permitting the audio signal from the terminal to be transmitted to members of the focused conference. At step 840, the conference server provides a text transcript of the conversation in the non-focused conference call to the terminal. This may be performed as described with respect to FIG. 4, and similar to step 550.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method implemented in a computer infrastructure including a computer device, comprising:
    establishing a primary conference call including a plurality of participants;
    establishing a subconference call including a subset of the plurality of participants;
    providing, by the computer device, respective output signals to each of the plurality of participants, wherein members of the primary conference call are provided with audio only of the primary conference call, and members of the subconference call are provided with audio of the subconference call; and
    providing, by the computer device, a visual display that shows respective groupings of members of the subconference call and members of the primary conference call,
    wherein the establishing the subconference call comprises detecting a predefined trigger word or phrase spoken by one of the plurality of participants.

2. The method of claim 1, wherein the providing the respective output signals includes providing the members of the subconference call with the audio of the primary conference call.

3. The method of claim 2, further comprising adjusting a volume of the audio of the primary conference call relative to the audio of the subconference call.

4. The method of claim 1, further comprising changing the visual display when one of the plurality of participants adds to or drops out of the subconference call.

5. The method of claim 1, further comprising:
generating a text transcript of the audio of the primary conference call; and
transmitting the text transcript to the members of the subconference call.

6. The method of claim 5, wherein the generating and the transmitting the text transcript are performed in real time for a duration of the subconference call.

7. The method of claim 5, wherein the transmitting the text transcript is performed at a conclusion of the subconference call.

8. The method of claim 1, wherein, upon the detecting, the one of the plurality of participants is placed into or taken out of the subconference call.

9. The method of claim 1, wherein the visual display comprises a graphical user interface (GUI), and further comprising receiving an instruction via the GUI to add or remove at least one of the plurality of participants to/from the subconference call.

10. The method of claim 1, wherein one of the plurality of participants is connected to the primary conference call or the subconference call using a first terminal, and further comprising:
detecting that the one of the plurality of participants is conducting another call on a second terminal;
muting the first terminal in the primary conference call or the subconference call; and
providing a text transcript of the primary conference call or the subconference call to the first terminal while the user is conducting the other call on the second terminal.

11. The method of claim 1, wherein one of the plurality of participants is connected to the primary conference call or the subconference call using a first terminal, and further comprising:
receiving a transfer command and transfer phone number from the first terminal;
initiating a call to a second terminal using the transfer phone number;
upon the second terminal answering the call, connecting the second terminal to the primary conference call or the subconference call, and disconnecting the first terminal from the primary conference call or the subconference call.

12. The method of claim 1, wherein one of the plurality of participants is connected to the primary conference call or the subconference call using a terminal, the one of the plurality of participants is connected to another conference call using the terminal, and further comprising:
determining a focused conference call and a non-focused conference call by detecting that the one of the plurality of participants is focused on either: (i) the primary conference call or the subconference call, or (ii) the other conference call;
muting the first terminal in the non-focused conference call;
providing a text transcript of the non-focused conference call to the terminal.

13. The method of claim 1, wherein one of the plurality of participants is connected to the primary conference call or the subconference call using a terminal, and further comprising:
detecting that the terminal is muted while the one of the plurality of participants is speaking; and
turning off the muting based on the detecting.

14. The method of claim 1, wherein a service provider at least one of creates, maintains, deploys and supports the computer infrastructure.

15. The method of claim 1, wherein steps of claim 1 are provided by a service provider on a subscription, advertising, and/or fee basis.

16. A method of deploying a system for managing a subconference call within a primary conference call, comprising:
providing a computer infrastructure that operates to:
establish the primary conference call including a plurality of participants;
establish the subconference call including a subset of the plurality of participants;
provide respective output signals to each of the plurality of participants, wherein members of the primary conference call are provided with audio only of the primary conference call, and members of the subconference call are provided with audio of the subconference call;
provide a visual display that shows respective groupings of members of the subconference call and members of the primary conference call;
generate a text transcript of the audio of the primary conference call; and
transmit the text transcript to the members of the subconference call,
wherein the transmitting is performed in real time for a duration of during the subconference call;
the providing the respective output signals includes providing the members of the subconference call with the audio of the primary conference call and an option to adjust a volume of the audio of the primary conference call; and
the establishing the subconference call comprises at least one of: detecting a predefined trigger word or phrase spoken by one of the plurality of participants, and receiving an instruction via a graphical user interface to add or remove at least one of the plurality of participants to/from the subconference call,
wherein the providing the respective output signals, the providing the visual display, the generating the text transcript, and the transmitting the text transcript are performed by the computer infrastructure including a computer device.

17. A system, comprising a conference server comprising a processor, a memory, and a conference manager application, wherein the conference manager application operates to:
establish the primary conference call including a plurality of participants;
establish the subconference call including a subset of the plurality of participants;
provide respective output signals to each of the plurality of participants, wherein members of the primary conference call are provided with audio only of the primary conference call, and members of the subconference call are provided with audio of the subconference call;
provide a visual display that shows respective groupings of members of the subconference call and members of the primary conference call; and
transmit a text transcript of a conversation of the primary conference call to the members of the subconference call.

18. The system of claim 17, wherein the providing the respective output signals includes providing the members of the subconference call with the audio of the primary conference call.

19. The system of claim 17, wherein the conference manager application operates to change the visual display when one of the plurality of participants adds to or drops out of the subconference call.

20. The system of claim 17, wherein the transmitting the text transcript is performed in real time for a duration of the subconference call.

21. The system of claim 17, wherein the transmitting the text transcript is performed at a conclusion of the subconference call.

22. The system of claim 17, wherein:
the establishing the subconference call comprises detecting a predefined trigger word or phrase spoken by one of the plurality of participants; and
upon the detecting, the one of the plurality of participants is placed into or taken out of the subconference call.

23. A computer program product comprising a computer usable storage medium having readable program code embodied in the storage medium, wherein the storage medium is an apparatus or device, the computer program code when executed on a computing device causes the computing device to:
establish the primary conference call including a plurality of participants;
establish the subconference call including a subset of the plurality of participants;
provide respective output signals to each of the plurality of participants, wherein members of the primary conference call are provided with audio only of the primary conference call, and members of the subconference call are provided with audio of the subconference call;
provide a visual display that shows respective groupings of members of the subconference call and members of the primary conference call; and
transmit a text transcript of a conversation of the primary conference call to the members of the subconference call, wherein the transmitting is performed in real time for a duration of the subconference call.

24. A computer system for establishing a conference call, the system comprising:
a CPU, a computer readable memory, and a computer readable storage media;
first program instructions to establish the primary conference call including a plurality of participants;
second program instructions to establish the subconference call including a subset of the plurality of participants;
third program instructions to provide respective output signals to each of the plurality of participants, wherein members of the primary conference call are provided with audio only of the primary conference call, and members of the subconference call are provided with audio of the subconference call;
fourth program instructions to provide a visual display that shows respective groupings of members of the subconference call and members of the primary conference call; and
fifth program instructions to transmit a text transcript of a conversation of the primary conference call to the members of the subconference call,
wherein the first, second, third, fourth, and fifth program instructions are stored on the computer readable storage media for execution by the CPU via the computer readable memory.

* * * * *